(12) United States Patent
Hanitzsch et al.

(10) Patent No.: US 7,603,849 B2
(45) Date of Patent: Oct. 20, 2009

(54) EXHAUST SYSTEM

(75) Inventors: Robert Hanitzsch, Kernen (DE); Josef Rudelt, Aichwald (DE)

(73) Assignee: J. Eberspacher GmbH & Co., KG, Esslingen (DE)

( * ) Notice: Subject to any disclaimer, the term of this patent is extended or adjusted under 35 U.S.C. 154(b) by 515 days.

(21) Appl. No.: 11/283,188

(22) Filed: Nov. 18, 2005

(65) Prior Publication Data
US 2006/0107655 A1 May 25, 2006

(30) Foreign Application Priority Data
Nov. 24, 2004 (DE) .................. 10 2004 056 791

(51) Int. Cl.
*F01N 3/00* (2006.01)
(52) U.S. Cl. .............. 60/286; 60/295; 60/298; 60/303; 239/128; 239/129; 239/132; 239/132.3; 239/132.5
(58) Field of Classification Search .......... 60/286, 60/303, 274, 295, 298, 301, 320; 239/128, 239/129, 132, 132.1, 132.3, 132.5
See application file for complete search history.

(56) References Cited

U.S. PATENT DOCUMENTS

| 6,192,677 | B1 * | 2/2001 | Tost ............... 60/286 |
|---|---|---|---|
| 6,279,603 | B1 * | 8/2001 | Czarnik et al. ......... 137/339 |
| 6,513,323 | B1 * | 2/2003 | Weigl et al. ............ 60/286 |
| 6,539,708 | B1 * | 4/2003 | Hofmann et al. ......... 60/286 |
| 6,814,303 | B2 * | 11/2004 | Edgar et al. ............ 239/128 |
| 6,996,976 | B2 * | 2/2006 | Rumminger et al. ....... 60/295 |
| 6,997,401 | B2 * | 2/2006 | Baasch et al. ........... 239/533.2 |
| 7,000,381 | B2 * | 2/2006 | Maisch ................ 60/286 |
| 7,021,047 | B2 * | 4/2006 | Hilden et al. ........... 60/286 |
| 7,168,241 | B2 * | 1/2007 | Rudelt et al. ........... 60/286 |
| 2006/0101810 | A1 * | 5/2006 | Angelo et al. ........... 60/286 |

FOREIGN PATENT DOCUMENTS

| AT | 759524 | 12/1953 |
|---|---|---|
| DE | 198 06 265 | 7/1999 |
| DE | 102 41 698 | 5/2003 |

* cited by examiner

Primary Examiner—Binh Q. Tran
(74) Attorney, Agent, or Firm—Howard IP Law Group, P.C.

(57) ABSTRACT

The present invention relates to an exhaust system for an internal combustion engine, in particular in a motor vehicle, having an exhaust line carrying exhaust gas away from the internal combustion engine and having a fuel injector for injecting fuel into the exhaust line. The fuel injector is mounted on the exhaust line via a mounting device. This mounting device has a receiving body into which the fuel injector is inserted and which is mounted on the exhaust line via a disk-shaped flange. To reduce the risk of overheating of the fuel injector, the flange is mounted on the receiving body via a constriction in cross section and/or on the exhaust line via a thermal insulator.

17 Claims, 1 Drawing Sheet

EXHAUST SYSTEM

This application claims foreign priority of German Patent Application No. DE 10 2004 056 791.3, filed Nov. 24, 2004 in Germany, which application is incorporated herein by reference in its entirety.

FIELD OF THE INVENTION

The present invention relates to an exhaust system for an internal combustion engine, in particular in a motor vehicle.

BACKGROUND OF THE INVENTION

Exhaust systems usually includes an exhaust line that carries the exhaust away from the internal combustion engine. In certain applications, it may be necessary to inject fuel into the exhaust line in addition. For example, the injection of such a secondary fuel upstream from an oxidation catalytic converter can greatly increase the exhaust temperature, e.g., to trigger regeneration of a particulate filter. For injection of fuel into the exhaust line, the exhaust system may be equipped with at least one fuel injector which is mounted on the exhaust line via a suitable mounting device. Essentially such a fuel injector may be one that is known per se for injection of fuel into the combustion chambers of an internal combustion engine.

It is problematical here that relatively high temperatures may occur in and/or on the exhaust line but at the same time the fuel injector must not exceed a certain maximum allowed operating temperature. It is fundamentally possible to actively cool the fuel injector to thereby prevent overheating of the fuel injector.

The present invention is concerned with the problem of providing an improved embodiment for an exhaust system of the type defined in the preamble in which the fuel injector in particular has improved protection from overheating.

SUMMARY OF THE INVENTION

This invention is based on the general idea of reducing heat transfer from the exhaust line to the fuel injector. This is accomplished first by the fact that a flange by means of which a receiving body into which the fuel injector is inserted is mounted on the exhaust line, which is itself mounted on said receiving body via a constriction in cross section and additionally is achieved by the fact that said flange is mounted on the exhaust line via a thermal insulator. The two measures may be used cumulatively or alternatively. The thermal insulator prevents heat transfer from the hot exhaust line to the flange. In addition the constriction in cross section inhibits the transfer of heat from the flange to the receiving body. Through the inventive measures described here, the heat flow to the fuel injector which is in the receiving body can be reduced. In this way, active or passive cooling measures, for example, are better able to dissipate the heat, thereby reducing the risk of overheating of the fuel injector.

According to an advantageous embodiment, a cooling channel that extends coaxially with a longitudinal axis of the fuel injector in a ring shape may be integrated into the receiving body. This cooling channel is arranged in the receiving body in such a way that it surrounds a receiving section of the receiving body in which there extends a nozzle section of the fuel injector having at least one injector hole for injecting fuel. In this way, with the help of the actively cooled receiving body, the area of the fuel injector, namely said nozzle section which is exposed to the greatest thermal load during operation is cooled especially intensely and is thus prevented from overheating.

According to an advantageous embodiment, the receiving body may have, on a side facing away from the flange, a tension sleeve which surrounds the fuel injector at least partially coaxially with its longitudinal axis and which carries on an end section facing away from the flange a tension body which braces the fuel injector axially against the receiving body. Due to this design, fixation of the fuel injector on the receiving body is ensured in a particularly simple manner. In addition, due to the clamping of the fuel injector with axial contact faces between the fuel injector and the receiving body, a prestressed contact is achieved, which supports heat transfer and thereby improves the cooling effect of the receiving body which is preferably actively cooled.

In an advantageous refinement, the tension body may be supported axially on a connecting element which is in turn supported axially on the fuel injector and is connected to a fuel supply. This connecting element thus forms the connection of the fuel injector to the fuel supply and is tied in here to the mounting of the fuel injector such that the tension body makes it possible to secure both the connecting element on the fuel injector and the fuel injector in the receiving body.

An especially compact design is obtained when the tension body is designed in the form of a sleeve and is aligned coaxially with the longitudinal axis of the fuel injector and the fuel supply is connected axially through the tension body to the connecting element.

Other important features and advantages of this invention are derived from the subclaims, the drawings and the respective description of the figures with reference to the drawings.

It is self-evident that the features mentioned above and those to be described in greater detail below may be used not only in the particular combination given but also in other combinations or even alone without going beyond the scope of the present invention.

BRIEF DESCRIPTION OF THE DRAWINGS

Preferred exemplary embodiments of the present invention are illustrated in the drawings and explained in greater detail in the following description, whereby the same reference numerals are used to refer to the same or functionally identical or similar components.

The figures show, each in schematic diagrams.

DETAILED DESCRIPTION OF THE INVENTION

Figure 1:
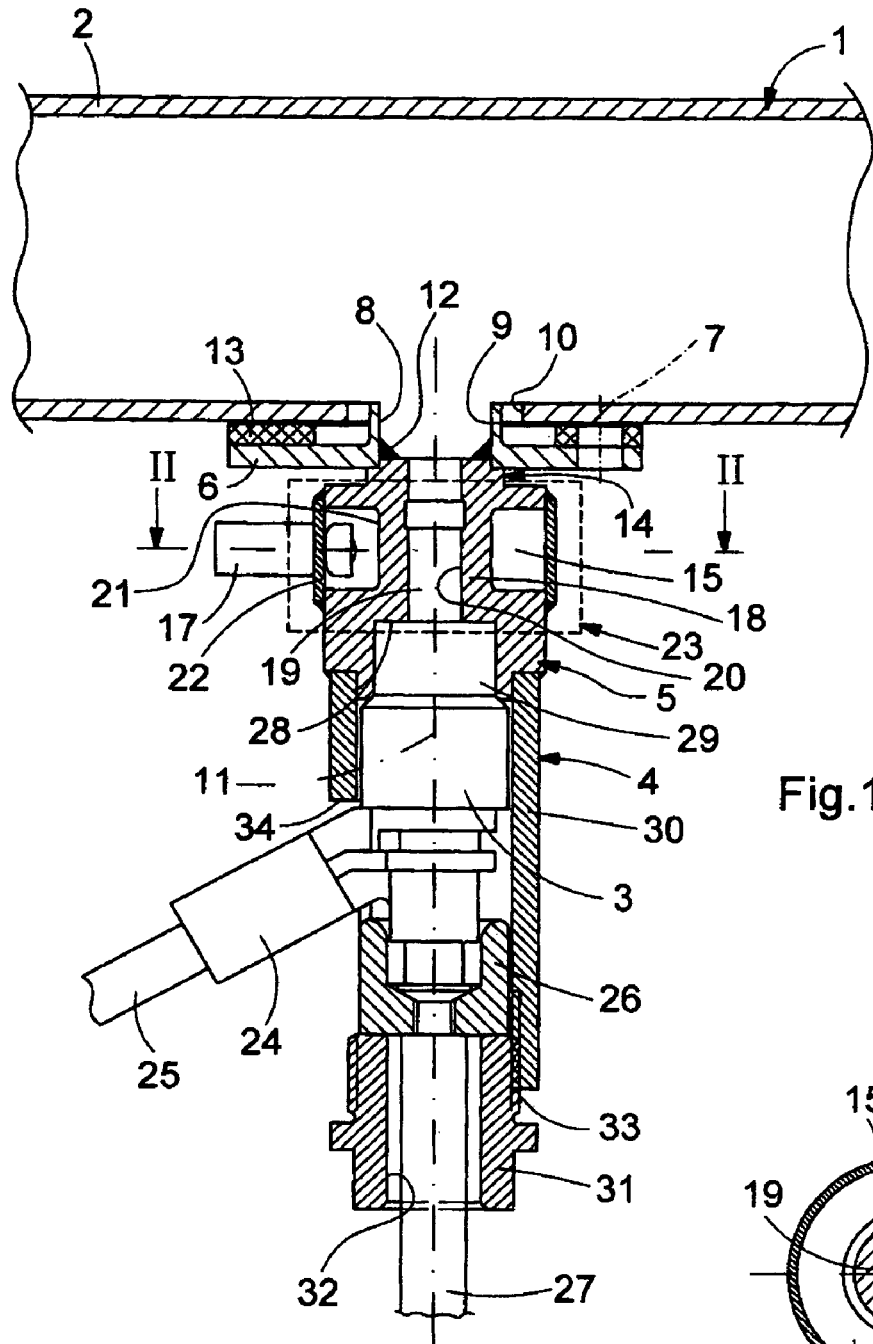
FIG. 1 is a longitudinal section through a section of an exhaust system in which a fuel injector is positioned.

According to FIG. 1, an exhaust system 1 of an internal combustion engine (not shown here) which may be provided in a motor vehicle in particular has an exhaust line 2 which carries the exhaust gas generated during operation of the internal combustion engine away from the internal combustion engine. Accordingly, the exhaust line 2 is usually a pipe or the like, only a small detail of which is shown here.

The exhaust system 1 is also equipped with at least one fuel injector 3 with the help of which fuel may be injected into the exhaust line 2. Such a fuel injection may be performed—if it is done upstream from an oxidation catalytic converter—to increase the temperature of the exhaust, e.g., in order to regenerate or desulfate an NOX storage catalytic converter.

The fuel injector 3 is mounted on the exhaust line 2 via a mounting device 4. The mounting device 4 includes a receiving body 5 and a flange 6 by which the receiving body 5 is mounted on the exhaust line 2. To this end, the flange 6 is designed in the form of a disk and is attached to the exhaust line 2 by multiple screw connections 7, for example. The flange 6 has a central opening 8 and is also equipped with a sleeve 9 which surrounds the central opening 8. The sleeve 9 is arranged on a side facing away from the receiving body 5 and protrudes away from the flange 6 on this side. The sleeve 9 protrudes into an opening 10 which is provided on the exhaust line 2 and through which the fuel is to be injected into the exhaust line 2. The flange 6 is arranged coaxially with respect to a central longitudinal axis 11 of the fuel injector 3. In addition, the flange 6 is connected to the receiving body 5 in the area of its central opening 8. This is achieved here through a connection section formed on the receiving body 5 at the end and inserted into the central opening 8. A welded connection 12, e.g., in the form of a throat weld is provided here to attach the flange 6 to the receiving body 5.

To reduce the heat transfer from the exhaust line 2 to the fuel injector 3, the flange 6 is mounted on the exhaust line 2 via a thermal insulator 13. The thermal insulator 13 is designed here as a ring disk and as a gasket at the same time. This prevents the escape of exhaust gases that are carried in the exhaust line 2 through the opening 10 into the environment of the exhaust line 2 is prevented in this way. Heat transfer from the exhaust line 2 to the flange 6 can be reduced by connecting the insulator 13 between the flange 6 and the exhaust line 2. It is important here for the flange 6 not to have any direct physical contact with the exhaust line 2. To this end, the inside cross section of the opening 10 is selected in particular to be larger than the outside cross section of the sleeve 9.

In addition or as an alternative to this measure, the flange 6 is mounted on the connecting body 5 via a constriction 14 in the cross section. This constriction 14 in the cross section, which is provided here on the connecting body 5, but essentially may also be provided on the flange 6, also inhibits the transfer of heat, namely from the flange 6 to the receiving body 5.

The constriction 14 is characterized in that larger cross sections occur on both sides of the constriction 14, i.e., on the flange 6 at one end and on the receiving body 5 on the other end. In the area of the constriction 14 there is thus a ring gap which acts more or less like air gap insulation.

It is clear that the measures described above, namely the insulator 13 and the constriction 14 in cross section are preferably used cumulatively, as is the case here.

Figure 2:
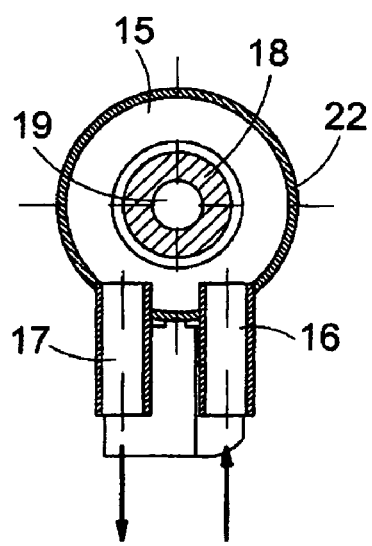
FIG. 2 is a cross section through a receiving body in the area of a cooling channel according to the sectional lines II in FIG. 1.

Through the measures mentioned here, heating of the receiving body 5 is inhibited. In addition, the heat is dissipated from the receiving body 5 by means of active cooling. To this end, a ring-shaped cooling channel 15 which is aligned coaxially with the central longitudinal axis 11 of the fuel injector 3 is integrated into the receiving body 5. According to FIG. 2, this cooling channel 15 extends in the form of a closed ring which is also connected to a forward flow connection 16 and to a return flow connection 17 through which the cooling channel 15 can receive a cooling medium.

As FIG. 1 shows, the cooling channel 15 coaxially surrounds a receiving section 18 of the receiving body 5. This receiving section 18 serves to receive a nozzle section 19, which has at least one injector hole (not shown here) for injecting fuel. On its axial end, this nozzle section 19 is arranged flush with the axial end of the receiving body 5. Accordingly, this nozzle section 19 is exposed to a comparatively high thermal stress on its end facing the exhaust line 2. This nozzle section 19 is preferably fitted into a bore 20 in the receiving section 18 so as to yield the greatest possible surface contact between the nozzle section 19 and the receiving section 18. In this way an intense heat transfer between the nozzle section 19 and the receiving section 18 can be achieved. In other words, the heat introduced into the nozzle section 19 from the exhaust line 2 is delivered to the receiving body 5 and removed through the cooling channel 15 and/or through the cooling medium flowing therein.

The cooling channel 15 is advantageously manufactured in the receiving body 5 here by equipping the cooling body 5 on the outside radially with a ringed groove 21 which is sealed on the outside radially by a sleeve 22. This sleeve 22 is attached to the receiving body 5, e.g., by means of peripheral welds and to this end is pushed onto the receiving body 5 on the outside. In addition, this closing sleeve 22 contains openings for the forward flow and the return (not identified more specifically here); the respective connections 16 and 17 are inserted into these openings (see in particular FIG. 2 in this regard).

To obtain especially good heat transfer properties and to protect against corrosion, the parts indicated there are preferably made of stainless steel to prevent corrosion in an area 23 indicated by an interrupted line.

The fuel injector 3 has an electric terminal 24 which protrudes radially or at least with a radial component with respect to the central longitudinal axis 11. Via a corresponding operating line 25, the fuel injector 3 can be operated for injection of fuel via this connection 24. In addition, the fuel injector 3 is equipped with a connecting element 26 with the help of which the fuel injector 3 is connected to a fuel supply 27, which is only indicated schematically here.

Intense physical contact between the fuel injector 3 and the receiving body 5 is important for a high cooling power. To this end, a seat 28 is provided in the receiving body 5, providing a comparatively large contact area between the fuel injector 3 and the receiving body 5. In addition, in a section 29 which protrudes into the receiving body 5, the fuel injector 3 may be fitted in to the receiving body 5 in such a way that here again the largest possible surface contact is achieved between the fuel injector 3 and the receiving body 5.

The seat 28 is axially oriented. To improve the heat transfer between the fuel injector 3 and the receiving body 5 in this axial seat 28, the fuel injector 3 may be inserted axially into the seat 28. To this end the receiving body 5 has a tension sleeve 30 on a side facing away from the flange 6. The tension sleeve 30 is arranged coaxially with the central longitudinal axis 11 and encloses the fuel injector 3 at least partially. In addition, the tension sleeve 30 has a tension body 31 on an end section facing away from the flange 6. This tension body 31 then produces an axial bracing of the fuel injector 3 against the receiving body 5. In other words, the tension body 31 introduces an axial force into the fuel injector 3, pressing the fuel injector 3 axially into its seat 28.

Essentially the tension body 31 may be supported axially directly on the fuel injector 3 for this purpose. With the preferred embodiment shown here, the tension body 31 is supported axially on the connecting element 26 which is in turn supported axially on the fuel injector 3. Accordingly, the tension body 31 is supported on the fuel injector 3 here indirectly via the connecting element 26. In this way, both the connecting element 26 and the fuel injector 3 may be attached to one another and to the connecting body 5 and/or to the mounting device 4 using only a single tension body 31. The tension body 31 is preferably designed with a sleeve shape as is the case here so that it has a central through-opening 32. The connecting element 26 is connected to the fuel supply 27 through this through-opening 32.

In the simplest case, the tension body 31 can be welded to the tension sleeve 30, e.g., by welding points. The embodiment shown here in which the tension body 31 is attached to the tension sleeve 30 by a threaded connection 33 is preferred.

Accordingly, the tension body 31 has an outside thread and is screwed into an inside thread formed on the tension sleeve 30.

To be able to insert the fuel injector 3 including its electric connection 24 into the tension sleeve 30, the tension sleeve 30 is provided with a recess 34 which is open axially in the area of the tension body 31 and through which the electric connection 24 can pass.

The tension sleeve 30 is welded here to the receiving body 5. It is likewise possible to design the tension sleeve 30 in one piece on the receiving body 5.

The screw design shown here for attaching the tension body 31 also yields the advantage that the tension body 31 may also be manufactured from a light metal such as aluminum to save on weight.

What is claimed is:

1. An exhaust system for an internal combustion engine comprising:
    an exhaust line carrying exhaust away from the internal combustion engine;
    at least one fuel injector for injecting fuel into the exhaust line; the fuel injector mounted on the exhaust line by a mounting device; the mounting device having
        a receiving body into which the fuel injector is inserted; the receiving body mounted on the exhaust line via a disk-shaped flange, wherein the flange is mounted on the receiving body via a constriction in the cross section,
    wherein the flange has a sleeve encompassing a central opening on a side facing away from the receiving body,
    wherein the exhaust line comprises an opening and wherein the inside cross section of the exhaust line opening is larger than the outside cross section of the sleeve thereby creating a gap between the exhaust line opening and said sleeve, and wherein said sleeve is not in contact engagement with said exhaust line.

2. The exhaust system according to claim 1, wherein the flange is aligned coaxially with a central longitudinal axis of the fuel injector and the fuel injector injects fuel into the exhaust line through the central opening encompassed by the sleeve.

3. An exhaust system for an internal combustion engine comprising:
    an exhaust line carrying exhaust away from the internal combustion engine;
    at least one fuel injector for injecting fuel into the exhaust line; the fuel injector mounted on the exhaust line by a mounting device; the mounting device having
        a receiving body into which the fuel injector is inserted; the receiving body mounted on the exhaust line via a disk-shaped flange, wherein the flange is mounted on the exhaust line via a thermal insulator,
    wherein the flange has a sleeve encompassing a central opening on a side facing away from the receiving body,
    wherein the exhaust line comprises an opening and wherein the inside cross section of the exhaust line opening is larger than the outside cross section of the sleeve thereby creating a gap between the exhaust line opening and said sleeve, and wherein said sleeve is not in contact engagement with said exhaust line.

4. The exhaust system according to claim 3, wherein the insulator comprises a gasket.

5. The exhaust system according to claim 1, wherein the constriction in the cross section is on the receiving body.

6. The exhaust system according to claim 1 further comprising: a ring-shaped cooling channel aligned coaxially with a central longitudinal axis of the fuel injector and integrated into the receiving body; the receiving body having a forward flow connection and a return flow connection for a cooling medium that flows through the cooling channel.

7. The exhaust system according to claim 6, wherein the cooling channel surrounds a receiving section of the receiving body in which a nozzle section of the fuel injector extends, having at least one injector hole for injecting fuel.

8. The exhaust system according to claim 6, wherein the cooling channel is formed by a ring groove which is provided on the outside of the receiving body and is sealed by a sleeve inverted over and attached to the receiving body and having openings for the forward flow and the return flow.

9. The exhaust system according to claim 1, wherein the receiving body includes a tension sleeve on a side facing away from the flange, said tension sleeve surrounding the fuel injector at least partially coaxially with the central longitudinal axis thereof and having a tension body on an end section facing away from the flange, said tension body pressing the fuel injector axially with tension against the receiving body.

10. The exhaust system according to claim 9, wherein the tension body is supported axially on a connecting element which is in turn supported axially on the fuel injector and is connected to a fuel supply.

11. The exhaust system according to claim 10, wherein the tension body is adapted in a sleeve shape and is aligned coaxially with the central longitudinal axis of the fuel injector, and wherein the fuel supply is connected axially to the connecting element through the tension body.

12. The exhaust system according to claim 9, wherein the tension body is welded to the tension sleeve, or the tension body is screwed into a thread formed on the tension sleeve.

13. An exhaust system for an internal combustion engine comprising:
    an exhaust line carrying exhaust away from the internal combustion engine;
    at least one fuel injector for injecting fuel into the exhaust line; the fuel injector mounted on the exhaust line by a mounting device; the mounting device having
        a receiving body into which the fuel injector is inserted; the receiving body mounted on the exhaust line via a disk-shaped flange, wherein the flange is mounted on the receiving body via a constriction in the cross section and/or is mounted on the exhaust line via a thermal insulator,
    wherein the receiving body includes a tension sleeve on a side facing away from the flange, said tension sleeve surrounding the fuel injector at least partially coaxially with the central longitudinal axis thereof and having a tension body on an end section facing away from the flange, said tension body pressing the fuel injector axially with tension against the receiving body, and
    wherein the tension sleeve includes a recess that is open axially on the end section facing away from the flange, an electric connection of the fuel injector passing through said recess.

14. The exhaust system according to claim 3, wherein the insulator comprises a ring disk.

15. The exhaust system according to claim 1, wherein the flange is mounted on the exhaust line via a thermal insulator.

16. The exhaust system according to claim 1, wherein the constriction comprises a first and a second larger cross-section on both sides of the constriction respectively.

17. The exhaust system according to claim 3, wherein the flange is mounted on the receiving body via a constriction in the cross section.

* * * * *

UNITED STATES PATENT AND TRADEMARK OFFICE
CERTIFICATE OF CORRECTION

PATENT NO. : 7,603,849 B2  Page 1 of 1
APPLICATION NO. : 11/283188
DATED : October 20, 2009
INVENTOR(S) : Hanitzsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 646 days.

Signed and Sealed this

Fifth Day of October, 2010

David J. Kappos
*Director of the United States Patent and Trademark Office*